March 2, 1954
H. A. HECKENDORF
2,670,889
CONTINUOUS MILK CAN FILLING ATTACHMENT
Filed Oct. 7, 1950
2 Sheets-Sheet 1
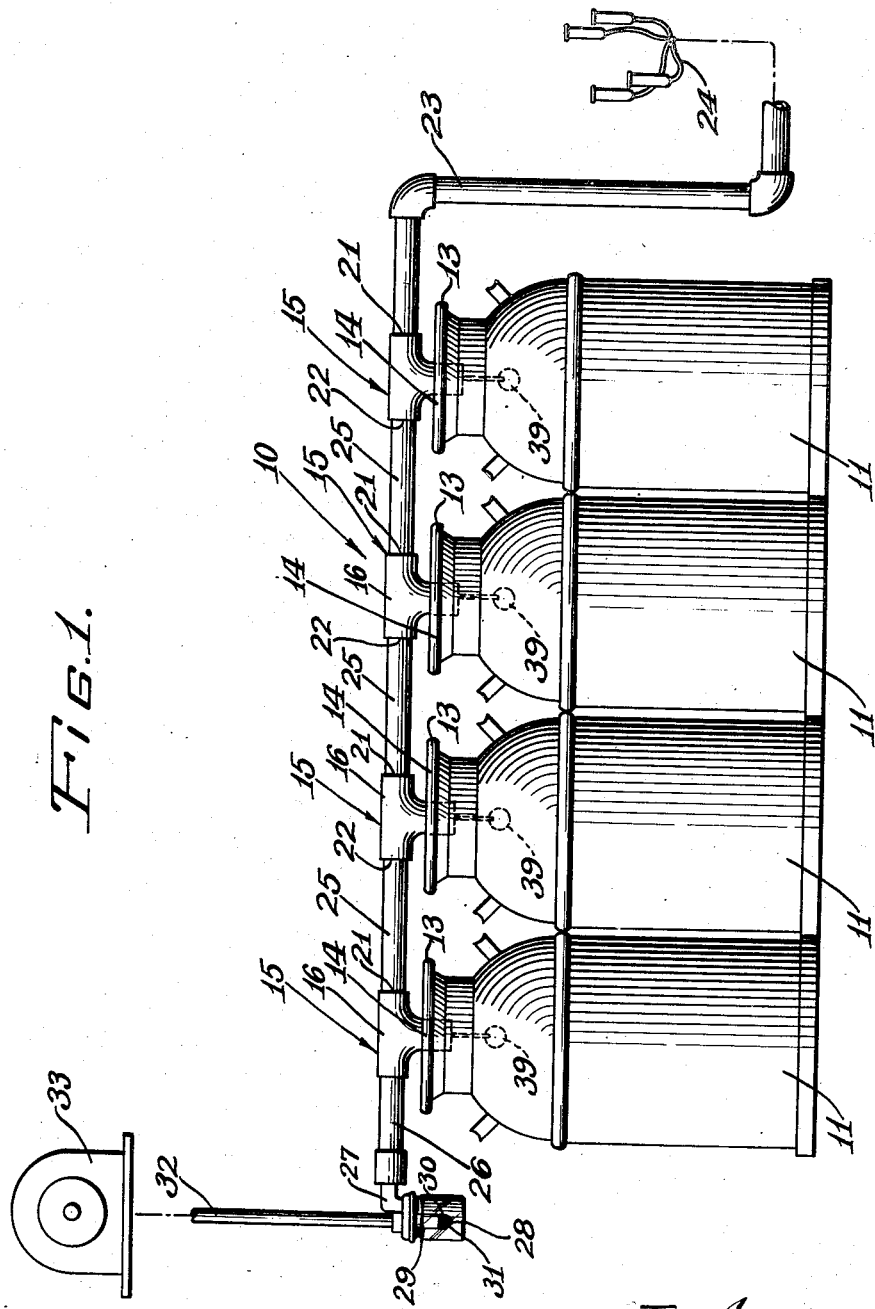
Inventor:
Howard A. Heckendorf
Paul O. Pippel
Atty.

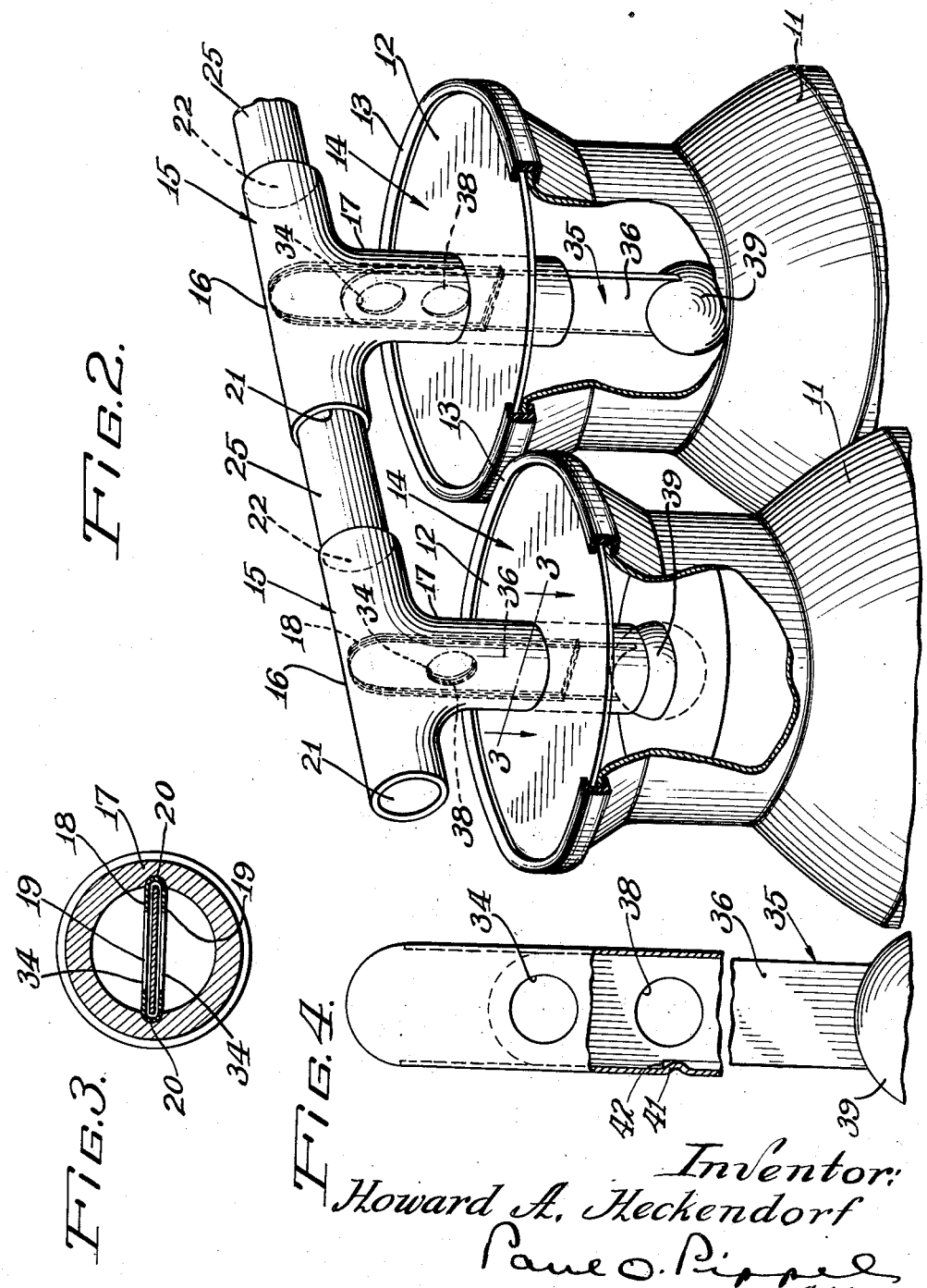

Patented Mar. 2, 1954

2,670,889

UNITED STATES PATENT OFFICE 2,670,889

CONTINUOUS MILK CAN FILLING ATTACHMENT

Howard A. Heckendorf, Chicago, Ill., assignor to International Harvester Company, a corporation of New Jersey Application October 7, 1950, Serial No. 189,038

8 Claims. (Cl. 226—116)

This invention relates to an improvement in a milk can filling attachment. More specifically this invention relates to a new type of can head structure especially adapted to a system wherein a plurality of milk cans are filled in series.

In pipe line milking systems it has been found desirable to direct the milk from the animals directly into a series of shipping cans which upon being filled are ready for immediate shipment. Since the cans are filled in series the milk during its travel from the cow is not subjected to atmosphere and repeated handling and thus possible contamination is greatly minimized. When milk cans are filled in series, the milk is first directed to one can which is filled, and milk is directed to a subsequent can in the same manner until the whole series of cans have been filled. For this purpose each can of the series is provided with a milk inlet and a milk outlet connection. The milk outlet of a preceding can is connected to the milk inlet of a succeeding can. The last can of the series is generally connected to a vacuum source so that a minus pressure exists within all of the cans. In systems of this kind it has been found desirable to provide a means to prevent excessive frothing of milk. The frothing occurs due to the intermingling of the additional milk coming into a can, with the milk already present within the can. Thus in order to prevent this occurrence it is desirable to provide some means which automatically by-passes the incoming milk to the succeeding can when a preceding can has been filled. It is applicant's prime object therefore to provide an improved construction for automatically by-passing milk from a preceding can to a succeeding can when the former can has been filled.

Still another object is to provide a device for by-passing milk from a milk inlet connection directly to a milk outlet connection positioned on a can head, the means including a slidable or movable member having a float connected thereto, the float being positioned to move the slidable member in response to the liquid level as the level within the milk can rises.

These and further objects will become more readily apparent upon a reading of the specification when examined in connection with accompanying sheets of drawings.

In the drawings:

Fig. 1 is a side elevational view of a continuous milk delivery system showing a plurality of improved milk can filling attachments.

Fig. 2 is a perspective view of a pair of milk cans connected in series, the cans having improved milk can filling attachments.

Fig. 3 is a sectional view of a filling attachment taken substantially along the line 3—3 of Fig. 2.

Fig. 4 is a fragmentary view in elevation of a baffling arrangement for a milk can filling attachment.

A continuous milk can filling system is generally designated by the reference character 10. The system 10 includes a plurality of cans 11 having, as best shown in Fig. 2, a closure plate 12 which is connected over the upper open end of the can by means of a rubber ring 13. The closure plate 12 thus suitably seals the can 11 and provides a filling head attachment or connection 14.

The head 14 is provided with a T-conduit 15 having a horizontal section 16 connected to a vertical section 17 in communication therewith. As best shown in Figs. 2, 3 and 4 the T-conduit 15 is provided with a baffle or partition 18. As best shown in Figs. 3 and 4, the baffle 18 consists of a flat tubular structure having wall portions 19. The wall portions 19 are positioned within the vertical section 17 and are secured within recesses 20.

The partition or baffle 18 divides the T-conduit into a milk inlet connection 21 and a vacuum and milk outlet connection 22.

As best shown in Fig. 1, the milk inlet connection 21 of the first can 11 is in communication with a milk line 23 which in turn is in communication with a teat cup cluster 24. The milk outlet 22 of one can is connected to the milk inlet 21 of a succeeding can by means of pipe connections 25. As best indicated in Fig. 1, therefore, the cans are interconnected in series. The last can of the series is provided with a vacuum outlet connection 26 which in turn is in communication with a conduit 27 communicating with a trap 28. The trap 28 is provided with a tube extension 29. A ball valve 30 is positioned beneath the lower end of the tube extension 29, the ball valve being supported within a cage 31 and being arranged to close the open end of the tube extension 29. A pipe 32 connects to the tube extension 29, this pipe being connected to a vacuum pump or tank as schematically shown at 33.

As best shown in Figs. 2, 3 and 4 the baffle or partition 18 is provided with an opening 34, this opening being adapted to communicate with the milk inlet and milk outlet connections 21 and 22. The opening 34 is normally closed or covered by means of a slidable member or slide 35 consisting of a flat strip of metal 36 which is adapted to reciprocate or move within the baffle 18 between the walls 19. The flat strip 36 is provided with an opening 38 which may be moved into position to register with the opening 34. When this occurs the inlet and outlet opening are in direct communication with each other. A ball float 39 is connected to the lower end of the strip 36, the ball 39 being effective to move the slidable member 35 in an upward direction in order to bring the openings 38 and 34 into registry. As best shown in Fig. 4, the tubular baffle 18 is provided with a dimple 41 which acts as a stop to engage an undercut shoulder 42 on the strip 36 thus limiting the downward travel of the slidable member 35.

In operation, milk flows through the pipe line 23 through the milk inlet 21 into the first can 11 of the series. The cans in this initial starting position, as shown in Fig. 1, are all empty and the float valve 39 of each can is positioned in such a manner that the openings 34 and 38 are out of registering alignment and a portion of the flat strip 36 serves to suitably block the opening 34. This is best shown in the position of the slidable member 35 of the right-hand can of Fig. 2. As liquid within the can 11 starts to rise and rises to the predetermined position shown in the left-hand can of Fig. 2, the float 39 pushes the slidable member 35 upwardly whereby the openings 34 and 38 are placed into registry. At this point milk flowing into the milk inlet connection 21 flows directly through the openings 34 and 38 to the milk outlet connection 22 without any intermingling of the milk which has already filled the can.

It can thus be seen that as each can is filled and as the level rises to the predetermined position, the float 39 is effective to move the slidable member 35 whereupon the milk inlet and outlet openings 21 and 22 are in direct communication so that the incoming milk is by-passed to a succeeding can. The cans are thus successively filled until the last can is filled. As shown in Fig. 1, as the last can is filled the float 39 also places the milk inlet 21 into direct communication with the vacuum connection 26. Milk thereupon flows to the vacuum connection 26 and thereupon into the trap 28. As the level of the liquid rises within the trap 28, the ball valve 30 fits over the tube extension 29 and closes the vacuum to the system. Thus the flow of milk ceases and the operation is stopped since all the cans are now filled.

It can now be seen that an efficient and inexpensive can filling arrangement has been provided, the system including a filling attachment for each can wherein the milk is diverted to a succeeding can after a previous can has been filled. The operation of the system is completely automatic, and since intermingling of the incoming milk is avoided excessive frothing does not occur.

It must be understood that changes and modifications may be made in the structure without departing from the spirit of the invention as disclosed nor the scope thereof as defined in the appended claims.

What is claimed is:

1. In a milking system for successively filling a series of milk cans to a predetermined level, comprising a can closure head adapted to seal each can, a filling connection on each closure head, a plurality of the filling connections including a T-conduit having a horizontal section and a vertical section, a stationary baffle disposed within the vertical section and cooperating with the horizontal section to divide said T-conduit into a milk inlet and a milk outlet communicating with the interior of the can, means connecting each outlet connection of a preceding can with the milk inlet connection of a succeeding can, a vacuum connection in the last can of the series adapted to provide a minus pressure within said cans, means connecting the milk inlet of the first can with a milk line, means interconnecting the milk inlet with the milk outlet of each T-conduit directly whereupon milk flowing into the milk inlet is carried directly to the milk outlet without intermingling with the milk in the can, comprising a wall on said baffle having an opening adapted to connect said milk inlet and said milk outlet, a vertically slidable member disposed within the vertical conduit and positioned in contiguous relation with respect to said wall on said baffle, said member including a portion normally blocking said opening in said baffle, said slidable member having an opening, and means for moving said opening in said slidable member into registry with said opening in said wall when the milk within said can has reached a predetermined level, said means including a float movable with the liquid level within said can.

2. In a milking system for successively filling a series of milk cans to a predetermined level, comprising a can closure head adapted to seal each can, a filling connection on each closure head, a plurality of the filling connections including a T-conduit having a horizontal section and a vertical section, a stationary baffle disposed within the vertical section and cooperating with the horizontal section to divide said T-conduit into a milk inlet and a milk outlet communicating with the interior of the can, means connecting each outlet connection of a preceding can with the milk inlet connection of a succeeding can, a vacuum connection in the last can of the series adapted to provide a minus pressure within said cans, means connecting the milk inlet of the first can with a milk line, means interconnecting the milk inlet with the milk outlet of each T-conduit directly whereupon milk flowing into the milk inlet is carried directly to the milk outlet without intermingling with the milk in the can, comprising a wall on said baffle having an opening adapted to connect said milk inlet and said milk outlet, a vertically slidable member disposed within the vertical conduit, said member including a portion normally in contiguous relation with respect to the wall of said baffle and blocking said opening in said baffle, said slidable member having an opening, and means for moving said opening in said slidable member into registry with said opening in said wall when the milk within said can has reached a predetermined level.

3. For a milking system wherein a series of cans are interconnected for successive filling; a can having a closure head, a filling connection on said head, said connection including a T-conduit having a first section in communication with the interior of the can and a second angularly disposed section in communication with said first section, a stationary baffle disposed within the T-conduit, said baffle dividing the T-conduit into a milk inlet connection and a combined vacuum and milk outlet connection, the milk inlet connection being adapted to connect to a source of milk, the baffle including an opening adapted to connect the milk inlet connection and the milk outlet connection, means for blocking said opening until a predetermined level is reached within said can, said means including a vertically movable slide disposed within the first section and in relative sliding contact with said baffle, the movable member including an opening, and means responsive to the rise of milk within the can for moving the opening in the movable slide into registry with the opening in the baffle whereupon milk within the inlet connection is by-passed to the vacuum outlet connection without materially intermingling with the milk in the can.

4. In accordance with the milking system and can as claimed in claim 3 wherein the responsive means includes a float connected to the movable slide.

5. For a milking system wherein a series of cans are interconnected for successive filling; a can having a closure head, a filling connection on said head, said connection including a first section in communication with the interior of the can and a second angularly disposed section in communication with said first section, a stationary baffle disposed within the filling connection, said baffle dividing said sections into a milk inlet connection and a combined vacuum and milk outlet connection, the milk inlet connection being adapted to connect to a source of milk, the baffle including an opening adapted to connect the milk inlet connection and the milk outlet connection, means for blocking said opening until a predetermined level is reached within said can, said means including a vertically movable slide disposed within the first section and in relative sliding engagement with said baffle, the movable member including an opening, and means responsive to the rise of milk within the can for moving the opening in the movable slide into registry with the opening in the baffle whereupon milk within the inlet connection is by-passed to the vacuum and outlet connection without materially intermingling with the milk in the can.

6. In a milking system for successively filling a series of milk cans to a predetermined level, comprising a can closure head adapted to seal each can, a filling connection on each closure head, a plurality of the filling connections including a conduit, a baffle disposed within the conduit to divide said conduit into a milk inlet and a milk outlet communicating with the interior of the can, means connecting each outlet connection of a preceding can with the milk inlet connection of a succeeding can, a vacuum connection on the last can of the series adapted to provide a minus pressure within said cans, means connecting the milk inlet of the first can with a milk line, means interconnecting the milk inlet with the milk outlet of each conduit directly whereupon milk flowing into the milk inlet is carried directly to the milk outlet without substantial intermingling with the milk in the can comprising, a wall on said baffle having an opening adapted to connect said milk inlet and said milk outlet, a vertically slidable member disposed within the conduit, said member including a portion normally blocking said opening in said baffle, said slidable member having an opening, and means for moving said opening in said slidable member into registry with said opening in said wall when the milk within said can has reached a predetermined level, said means including a float movable with the liquid level within said can.

7. A milk can adapted to connect to another milk can for successive filling under vacuum comprising a filling connection including a conduit communicating with the interior of the can, a partition disposed within said conduit to divide said conduit into a milk inlet connection and a combined vacuum and milk outlet connection, said partition having an opening adapted to provide for direct communication between the inlet and the outlet, the milk inlet being adapted to deliver milk to said can, means for blocking and unblocking said opening during predetermined liquid levels within said can, said means including a slidable member having a portion blocking said opening during a first position and a portion provided with an opening for registering with the opening in said partition in a second position, said slidable member being movable to said second position in response to the rise of liquid to a certain level whereby milk from the inlet connection is directly by-passed to said combined vacuum and milk outlet.

8. A milk can adapted to connect to another milk can for successive filling under vacuum comprising a filling connection including a conduit communicating with the interior of the can, a partition disposed within said conduit to divide said conduit into a milk inlet connection and a combined vacuum and milk outlet connection, said partition having an opening adapted to provide for direct communication between the inlet and the outlet, the milk inlet being adapted to deliver milk to said can, means for blocking and unblocking said opening during predetermined liquid levels within said can, said means including a slidable member having a portion blocking said opening during a first position and a portion provided with an opening for registering with the opening in said partition in a second position, and a float connected to the slidable member for moving the member to one of the positions during the rise of liquid to a predetermined level whereby milk from the inlet connection is directly by-passed to said combined vacuum and milk outlet.

HOWARD A. HECKENDORF.

References Cited in the file of this patent

UNITED STATES PATENTS

| Number | Name | Date |
|---|---|---|
| 272,992 | Vibbard | Feb. 27, 1883 |
| 895,208 | Sinclair | Aug. 4, 1908 |
| 899,659 | Craddock et al. | Sept. 29, 1908 |
| 1,048,597 | Sheppard | Dec. 31, 1912 |
| 1,747,814 | Bradley | Feb. 18, 1930 |
| 2,006,393 | Hapgood | July 2, 1935 |
| 2,037,467 | Hapgood | Apr. 14, 1936 |
| 2,380,771 | McDonald | July 31, 1945 |
| 2,498,401 | Duncan | Feb. 21, 1950 |

FOREIGN PATENTS

| Number | Country | Date |
|---|---|---|
| 854,114 | France | Jan. 2, 1940 |